(12) United States Patent
Hendriks et al.

(10) Patent No.: US 6,848,877 B2
(45) Date of Patent: Feb. 1, 2005

(54) SYSTEM FOR MOVING AND HANGING ARTICLES

(76) Inventors: Rob Hendriks, 3666 Claus Road, Vineland Station (CA), L0R 2S0; Ken Giesbrecht, 4380 Jordan Road, Jordan Station (CA), L0R 1S0

( * ) Notice: Subject to any disclaimer, the term of this patent is extended or adjusted under 35 U.S.C. 154(b) by 189 days.

(21) Appl. No.: 10/162,364

(22) Filed: Jun. 3, 2002

(65) Prior Publication Data

US 2003/0223850 A1 Dec. 4, 2003

(51) Int. Cl.$^7$ ................................................ B65G 1/16
(52) U.S. Cl. .................... 414/281; 414/266; 414/279
(58) Field of Search ................................ 414/266, 279, 414/281

(56) References Cited

U.S. PATENT DOCUMENTS

| | | | | |
|---|---|---|---|---|
| 2,682,345 A | * | 6/1954 | Neaverson ................... | 414/266 |
| 2,816,643 A | * | 12/1957 | Klamp ..................... | 198/465.4 |
| 3,051,096 A | * | 8/1962 | Walsh et al. ............. | 198/687.1 |
| 3,180,279 A | * | 4/1965 | Thibault ....................... | 104/89 |
| 4,717,305 A | * | 1/1988 | Edwards ..................... | 414/349 |
| 5,509,572 A | * | 4/1996 | Curtis ......................... | 221/76 |
| 5,573,101 A | * | 11/1996 | Ouwejan .................... | 198/349 |
| 5,899,255 A | * | 5/1999 | Petracini et al. ............ | 160/343 |
| 6,152,288 A | * | 11/2000 | Woltjer et al. ........... | 198/465.4 |

* cited by examiner

Primary Examiner—Thomas J. Brahan
(74) Attorney, Agent, or Firm—Townsend and Townsend and Crew LLP

(57) ABSTRACT

A system for maneuvering and hanging articles on rails. The system is operable to select one or more hanging articles, disengage their hooks from the rails, reposition them, and re-hang them in a new position on the rails. The system includes a cart for lateral movement upon a set of rails, the cart having wings for lifting hanging articles off the rails and setting hanging articles onto the rails. The cart has a lifting mechanism, which can be lowered so as to drop hanging articles down to a work area or to raise the hanging articles for placement upon the rails. The system may be employed in a greenhouse for moving hanging baskets of plants.

37 Claims, 9 Drawing Sheets

US 6,848,877 B2

SYSTEM FOR MOVING AND HANGING ARTICLES

FIELD OF THE INVENTION

This invention relates generally to a system for moving and hanging articles, and more particularly to a system for moving and hanging plant containers or baskets in a greenhouse.

BACKGROUND OF THE INVENTION

In a greenhouse operation or other warehouse-like environment, articles are often hung above other articles in order to economize on space. For example, in a greenhouse where trays of plants may be kept on the floor and on benches, further plants may be hung above the trays in hanging baskets.

A complication that arises in having articles hung above other articles is that the hanging articles can be very difficult to reach, especially if hung out of reach as would normally be the case in order to avoid bumping into the articles or crowding a workspace. In a greenhouse, in particular, this presents a difficulty since the hanging baskets must often be moved between various areas of the greenhouse and even outside to expose the hanging plants to external conditions. It is also often necessary to have access to the hanging baskets in order to fertilize or water the plants or to inspect their health.

Accordingly there remains a need for handling hanging baskets and the like.

SUMMARY OF THE INVENTION

The present invention provides a system in which articles are hung on rails and an operator may employ the system to select one or more hanging articles, disengage their hooks from the rails, reposition them, and re-hang them in their new position on the rails, or to transport the handing articles to a workstation. According to one embodiment, the system also enables an operator to lower selected articles from the rails to a lower height and to raise selected articles up to the rails to be hung.

Further aspects and features of the present invention will be understood by those skilled in the art from a review of the following description of specific embodiments together with the accompanying drawings.

BRIEF DESCRIPTION OF THE DRAWINGS

Reference will now be made, byway of example, to the accompanying drawings which show embodiments of the present invention, and in which.

DESCRIPTION OF AN EMBODIMENT

Figure 1:
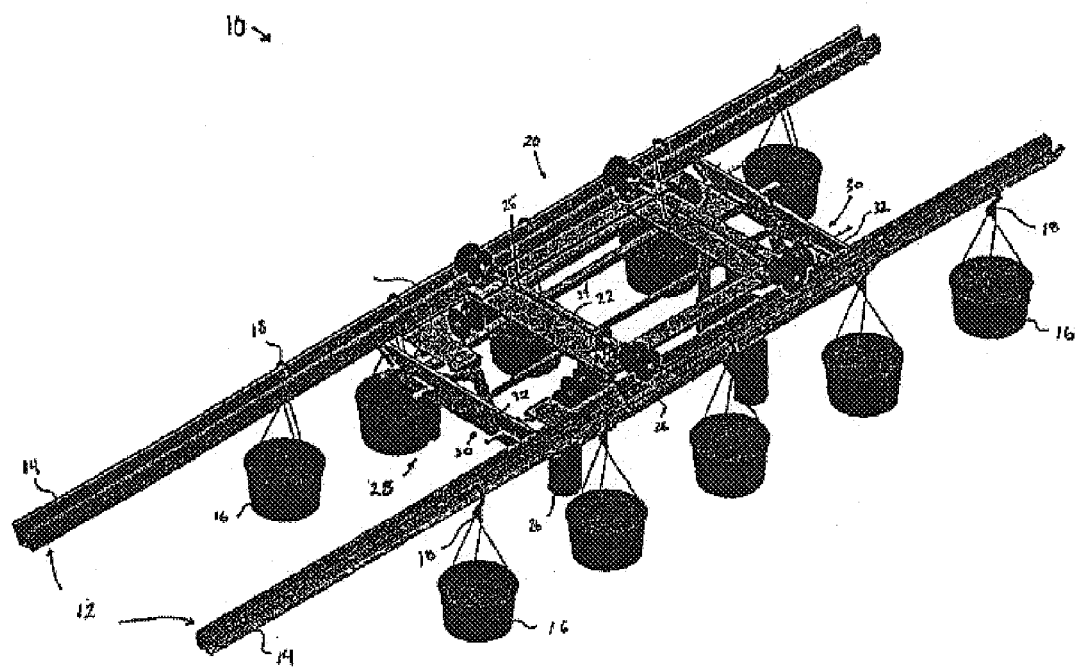
FIG. 1 shows a perspective view of a system according to the present invention, in use in conjunction with baskets.
Figure 2:
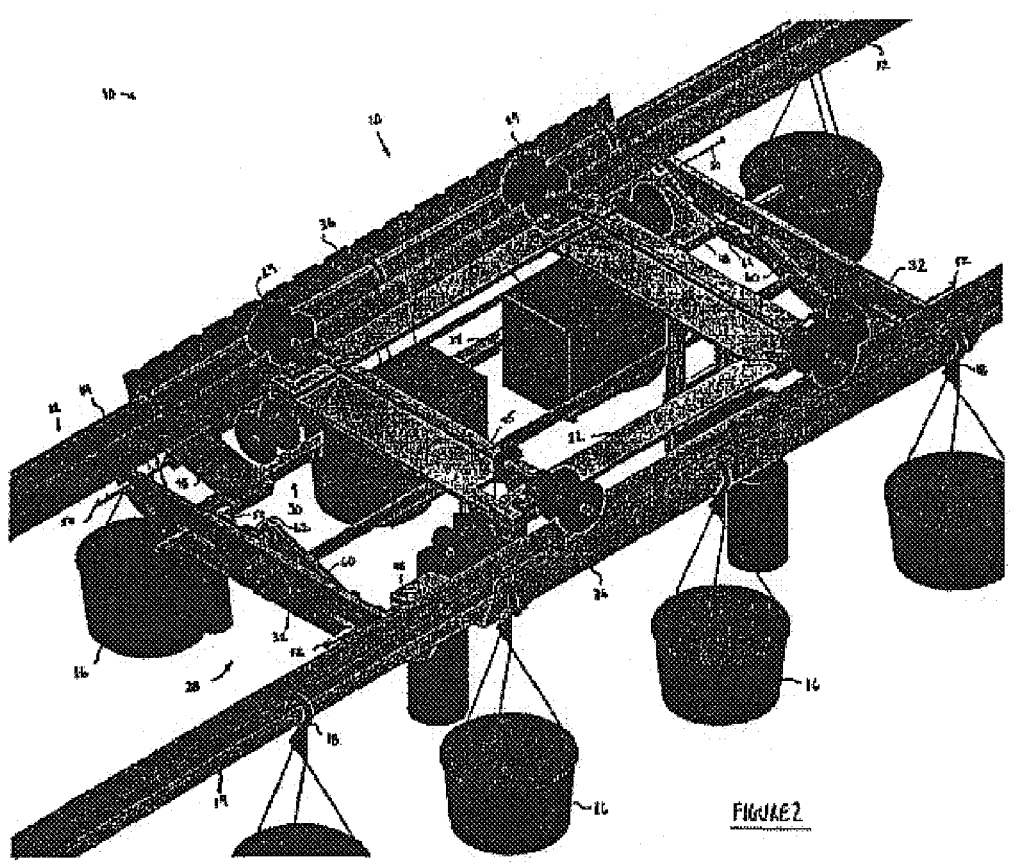
FIG. 2 shows an enlargement of the perspective view of FIG. 1.

Reference is first made to FIGS. 1 and 2, which show a perspective view of an embodiment of a system 10 according to the present invention for moving hanging baskets in a greenhouse. The embodiment described herein relates to the selection and movement of hanging planter baskets in a greenhouse, although those skilled in the art will understand that the invention is not limited to this application. Those skilled in the art will appreciate that the invention may be used in connection with the movement of other hanging articles, for example, lights, and may be used in connection with warehouses and in other applications.

The system 10 features a pair of spaced apart rails 12. Each rail 12 includes a lip 14 running upon its outer side from which articles may be hung. The system 10 may be utilized in conjunction with a plurality of hanging baskets 16 supported by hooks 18 that engage the lip 14 running along the outside of one of the rails 12.

Figure 3:
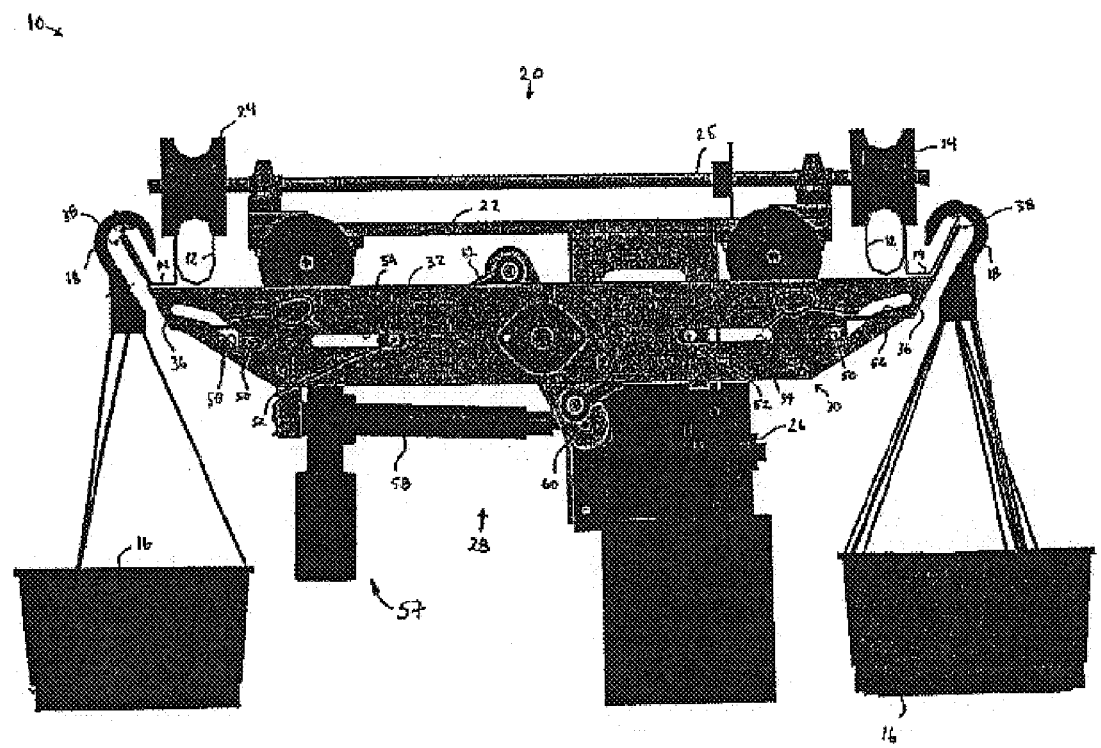
FIG. 3 shows an end view of the system of FIG. 1 with wings in the retracted position.

In one embodiment as shown in FIG. 3, the rail 12 is tubular and the lip 14 is formed of an elongated sheet of material attached to the outer wall of the tubular rail 12 and bent to form a trough running along the outside of the rail 12, as shown in FIG. 3, which depicts an end view of the system 10. The section for the lip 14 is spot welded, bolted or otherwise secured to the tubular rail 12. The lip 14 may also be integrally formed with the rail 12.

Reference is made again to FIGS. 1 and 2, which show that the system 10 further includes a cart 20 that rolls along the rails 12. The cart 20 includes an upper frame 22 having four wheels 24 (FIG. 2) rotatably attached to the upper frame 22. The wheels 24 ride upon the rails 12. In one embodiment, the wheels 24 have a concave circumferential profile to provide laterally stable contact with the tubular rail 12. The wheels 24 permit the cart 20 to be easily moved from one position on the rails 12 to another position.

In one embodiment, at least one of the wheels 24 is operatively coupled to a motor 26 so as to power the movement of the cart 20 on the rails 12. The motor 26 is an electric motor and sources its power through one or more batteries mounted upon the cart 20. The motor 26 is coupled to a drive shaft 25 which is in fixed rotational engagement with at least one of the wheels 24. The coupling of the motor 26 to the drive shaft 25 is achieved in any manner, including belts, chains or other means of transmission of rotational force. Control for the motor 26 may be provided through a control box or switch (not shown) suspended from the cart 20 and easily accessible by a user.

The cart 20 further includes a lifting mechanism 28 disposed below the upper frame 22. The lifting mechanism 28 includes a lower frame 30. In one embodiment, the lower frame 30 includes a pair of end plates 32 held in spaced relation by a pair of elongate frame members 34.

Figure 4:
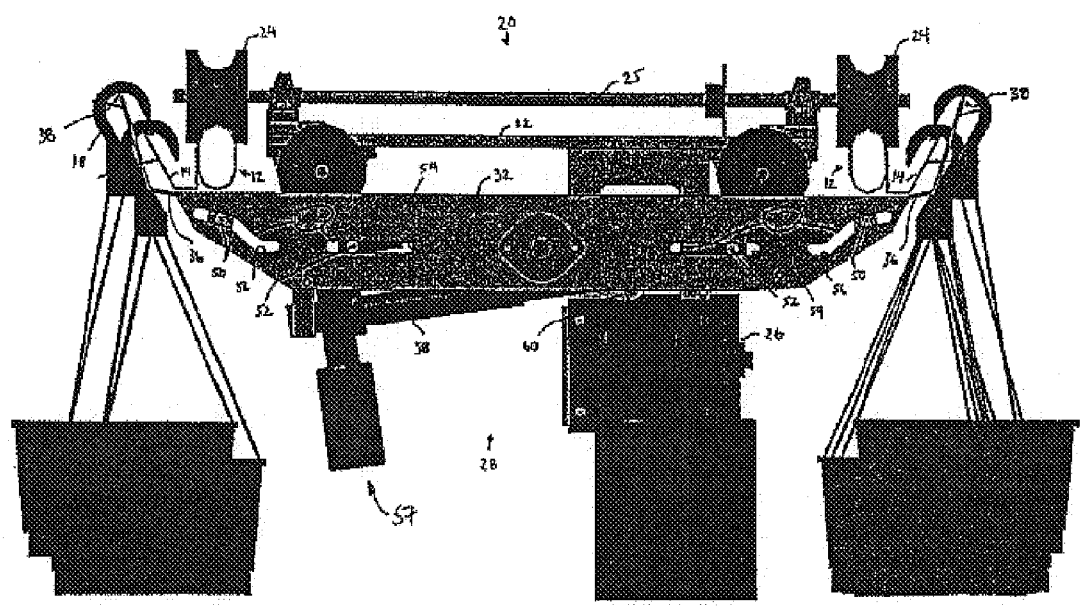
FIG. 4 shows an end view of the system with the wings in the extended position.

The lifting mechanism 28 further includes a pair of wings 36 displaceably coupled to the lower frame 30. As shown in FIG. 3, the wings 36 extend outwards and upwards on either side of the lower frame 30. The wings 36 feature an outer edge 38. The wings 36 are moveable between a retracted position (FIG. 3) and an extended position (FIG. 4). In the retracted position, the outer edge 38 of each wing is disposed below the lip 14 that runs along the rails 12. In this position, the outer edge 38 does not contact any hooks 18 that are hanging on the lip 14.

Reference is now made to FIG. 4, which shows the position of the wings 36 in the extended position. To move from the retracted position to the extended position, the wings 36 are moved upwards and outwards. The outer edge 38 of each wing 36 is thereby raised above the lip 14 such that the outer edge 38 contacts and lifts any hooks 18 resting upon the lip 14. With the wings 36 in the extended position the hanging baskets 16 are supported on the wings 36 and therefore may be moved using the mechanism of the cart 20.

Figure 5:
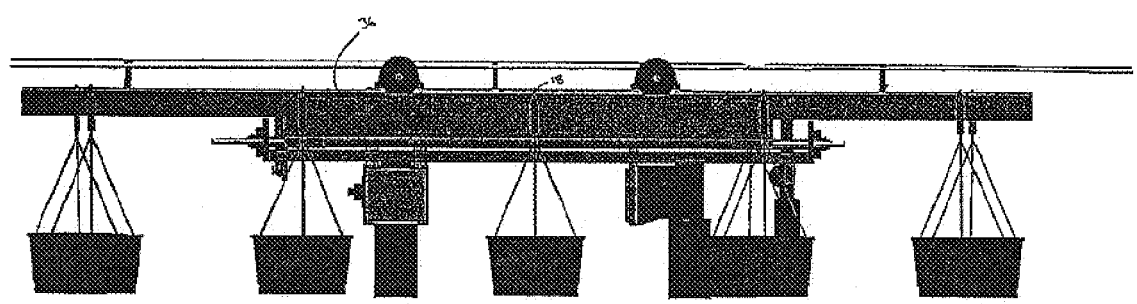
FIG. 5 shows a side view of the system with the wings in the retracted position.
Figure 6:
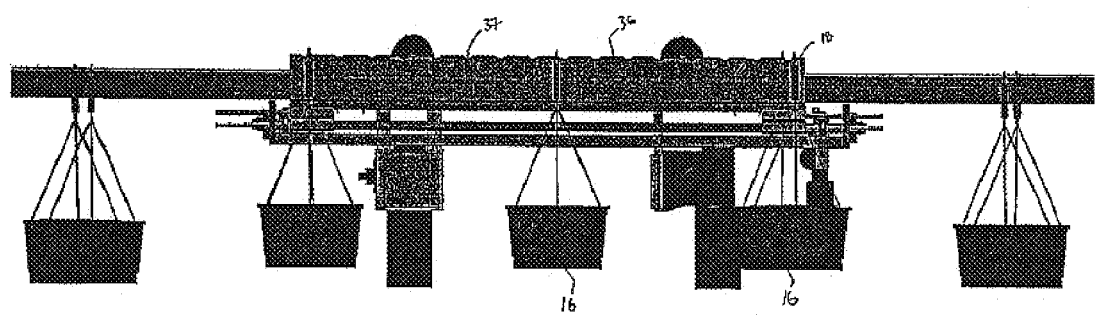
FIG. 6 shows a side view of the system with the wings in the extended position.

The wings 36 are preferably operatively coupled together, such that they are both in the same position at any given time; however, they could operate independently. In one embodiment, the wings 36 extend along a length of the rail 12 sufficient to engage the hooks 18 of multiple hanging baskets 16, as shown in the side views of FIGS. 5 and 6. In FIG. 5, the wings 36 are shown in their retracted position, i.e. disposed below the lip 14 (FIG. 3). In FIG. 6, the wings 36 are shown in their extended position, i.e. disposed above the lip 14 (FIG. 4). In the extended position, the wings 36 contact and lift a plurality of baskets 16 by their hooks 18. The wings 36 may be provided with a plurality of transverse notches 37 or serrations as shown in FIG. 6. The transverse notches 37 prevent any hooks 18 from sliding along the wings 36 once the wings 36 are in the extended position.

Although the described embodiment features wings 36 of sufficient length to support multiple baskets 16, it will be understood that the system 10 could feature wings 36 of longer or shorter lengths. The wings 36 may be sufficiently short as to permit the selection of a single basket at a time.

Reference is now made to FIGS. 2, 3 and 4, to describe an embodiment of the lifting mechanism 28. In one embodiment, each end of the wings 36 includes an inwardly extending flange 48 (FIG. 3), to which are mounted two horizontally extending pins or rods 50, 52 as also shown in FIG. 3. The innermost rod 52 is mounted to slidably engage a horizontal slot 54 in the end plate 32. The outer rod 50 is mounted to slidably engage a slanted slot 56 in the end plate 32. As shown in FIG. 3, the slanted slot 56 includes a short horizontal portion, a relatively sharp upwardly slanted portion and relatively gentle outwardly slanted portion.

On at least one side of the cart 20, one or more of the inner rods 52 are coupled to a reciprocating actuator 57 to cause them to move back and forth in the horizontal slots 54. In one embodiment, the reciprocating actuator 57 includes a pivot member 60 rotatably coupled to the midpoint of the end plate 32. The ends of the pivot member 60 are rotatably coupled to pivot arms 62, which are in turn coupled to the inner rods 52. The reciprocating actuator 57 further includes a linear actuator 58 mounted to the end plate 32 and operatively coupled to an end of the pivot member 60. In operation, the linear actuator 58 causes the pivot member 60 to pivot, which, through the pivot arms 62, causes the inner rods 52 to slide within the horizontal slots 54.

The retracted position of the wing 36 corresponds to the outer rod 50 being positioned at the end of the slanted slot 56 in the short horizontal portion, as shown in FIG. 3. When in the retracted position, the inner rod 52 is positioned at the inner end of the horizontal slot 54. When the reciprocating actuator 57 causes the wing 36 to moved toward the extended position, the inner rod 52 is urged outwards in the horizontal slot 54. The force upon the inner rod 52 is translated, through the flange 48, to the outer rod 50 which is urged outwards, up the sharp upwardly slanted portion of the slanted slot 56, and then into the gentle outwardly slanted portion. In the extended position, the rods 50, 52 are located in the outer ends of the slots 54, 56, as shown in FIG. 4.

The movement of the outer rod 50 in the slanted slot 56 causes the wing 36 to move first slightly outwards, away from the lip 14, then slantingly upwards to engage and lift any hooks 18 that meet its outer edge 38, and then slantingly outwards to move the hooks 18 outwards.

In one embodiment, the outer edges 38 of the wings 36 are moved both upwards above the lip 14 and outwards beyond the lip 14 such that the hooks 18 are carried free from the lip 14. With the hooks 18 moved upwards and outwards beyond the lip 14, the baskets 16 may be directly lowered without the hooks 18 catching upon the lip 14.

Figure 7:
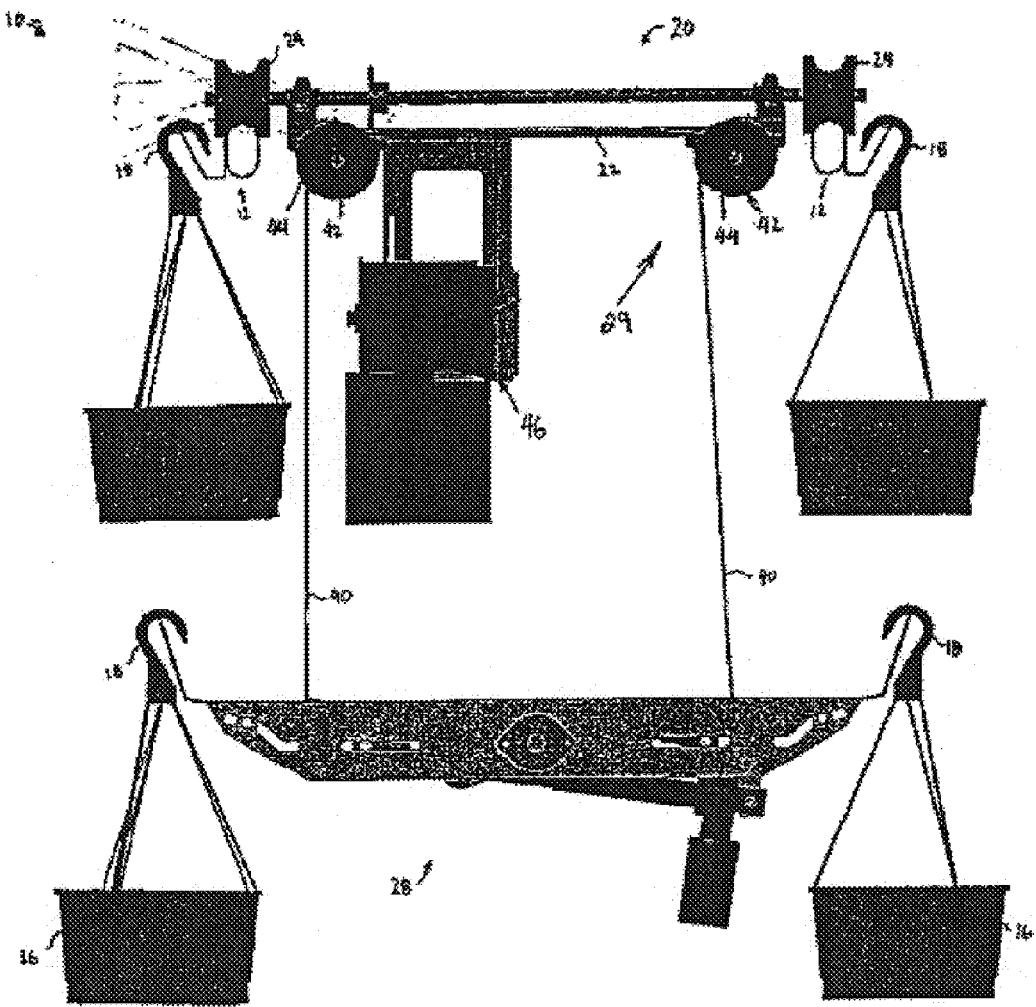
FIG. 7 shows an end view of the system with a lifting mechanism in a lowered position.

Reference is now made to FIG. 7, which shows the system 10 with the lifting mechanism 28 in a lowered position. The lifting mechanism 28 may be coupled to the upper frame 22 through a hoisting mechanism 29. The hoisting mechanism 29 comprises means of raising and lowering the lifting mechanism 28 relative to the upper frame 22. As shown in FIG. 7, one embodiment of the hoisting mechanism 29 is a cable and pulley system. The hoisting mechanism 29 may also include a belt and pulley system, a chain and socket system, a bolt and screw system, or a rack and pinion system.

As shown in FIG. 7, in one embodiment of the cart 20, the hoisting mechanism 29 includes a set of four cables or belts 40, each spooled upon a pulley 42 (two are shown) rotatably mounted to the upper frame 22. The pulleys 42 are mounted upon rods 44 each of which further includes a drive wheel (not shown). The drive wheel is operatively coupled to an actuator, which in one embodiment is an electric motor 46. The motor 46 may be coupled to the drive wheels through a chain, belt or other transmission means (not shown).

Figure 8:
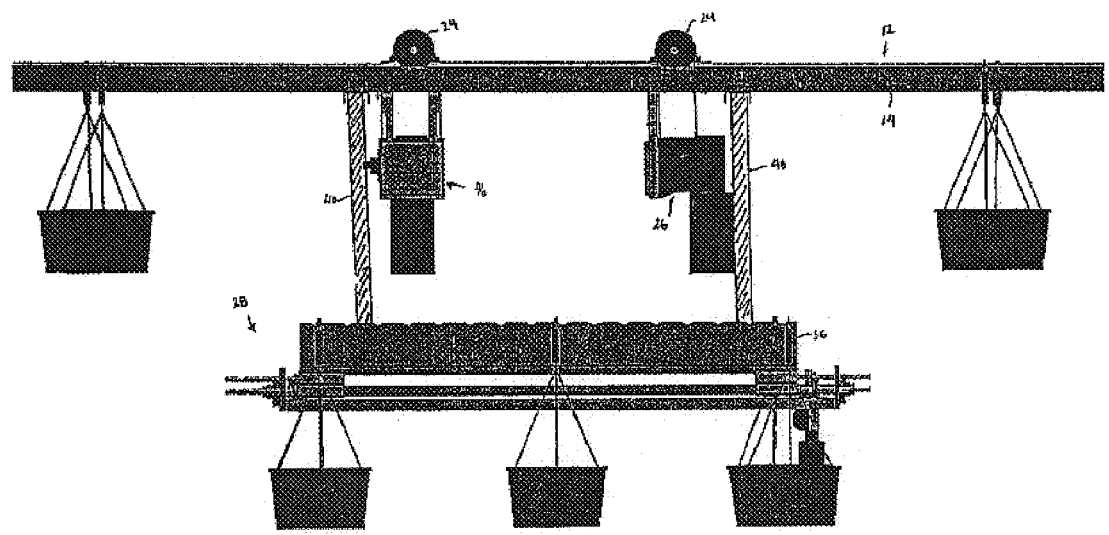
FIG. 8 shows a side view of the system with the lifting mechanism in the lowered position.

Through the hoisting mechanism 29, the lifting mechanism 28 is lowered from its operational position adjacent the upper frame 22 to a loading position closer to a user's work area, as shown in FIG. 7. Once lowered, the lifting mechanism 28 is loaded or unloaded with hanging baskets 16, or the hanging baskets 16 on the lifting mechanism 28 are treated, watered or otherwise dealt with. In the loading position, the cart 20 moves along the rails 12 while supporting hanging baskets 16 upon the lowered lifting mechanism 28 without disturbing any of the other hanging baskets 16 upon the rails 12. The lifting mechanism 28 is raised up to the operational position in order to replace the hanging baskets 16 upon the rail 12. FIG. 8 shows a side view of the system 10 with the lifting mechanism 28 in the loading position.

As with the motor 26 for controlling the lateral movement of the cart 20, the motor 46 for the vertical displacement of the lifting mechanism 28 is controlled through a control box or switch (not shown) suspended from the cart 20 and easily accessible by a user. Similarly, control of the linear actuator 58 for operating the wings 36 is provided through a control box or switch suspended from the cart. A single control box or set of switches is provided to enable user control of the various mechanized elements of the cart 20. The motors comprise battery-powered electric motors, but may be powered in any other manner, including through solar energy or gas.

Although the system 10 and cart 20 have been described as featuring motorized lateral and vertical movement and motorized wing 36 movement, the various forces for providing the movements may be provided through other means, including hydraulics or manual mechanical force. The range of alternative embodiments will be apparent to those ordinarily skilled in the art.

The rails 12 of the present system 10 may be attached to the existing structure of a warehouse or greenhouse. There are provided supports that mount to the outer face of the rails 12 and extend upwards so as to be securely attached to existing interior framing of the warehouse or greenhouse. In such a manner, the rails 12 are securely hung from beams or other structural members of the environment.

Figure 9:
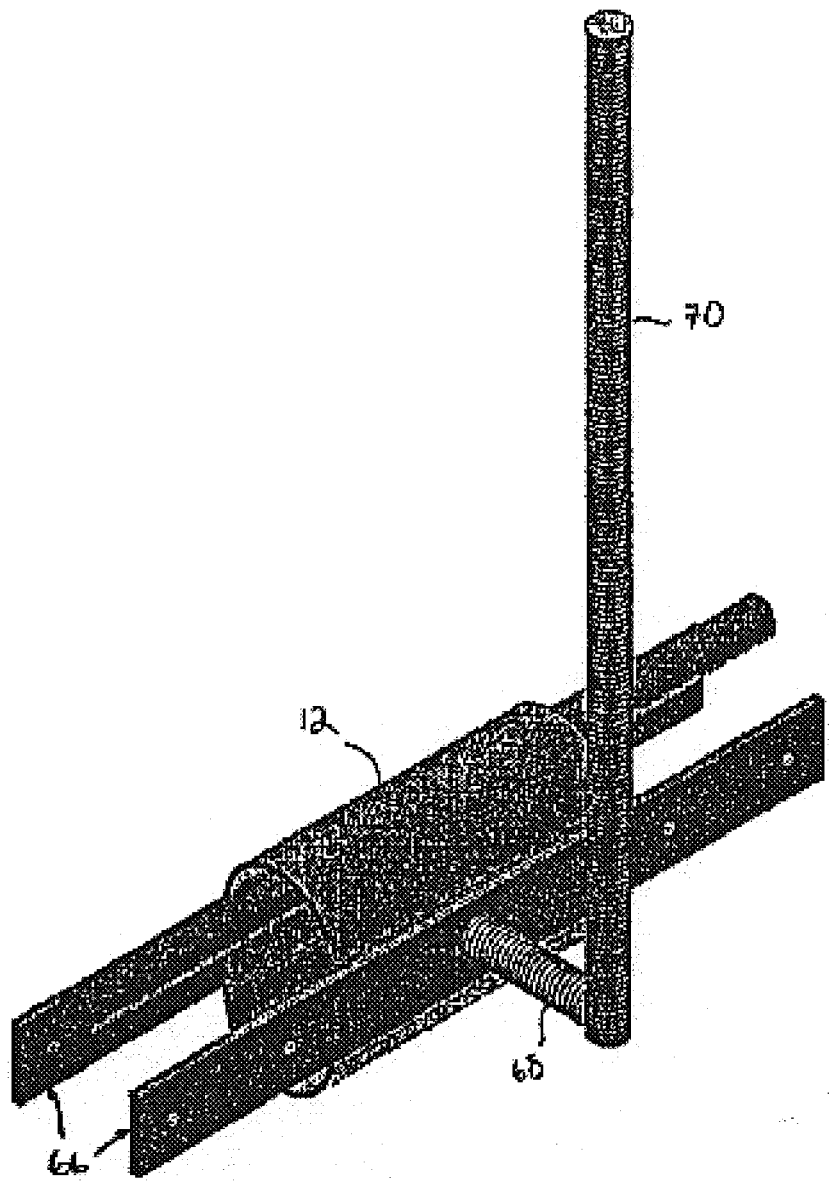
FIG. 9 shows a support for use in mounting rails of the system to an existing structure.
Figure 1:
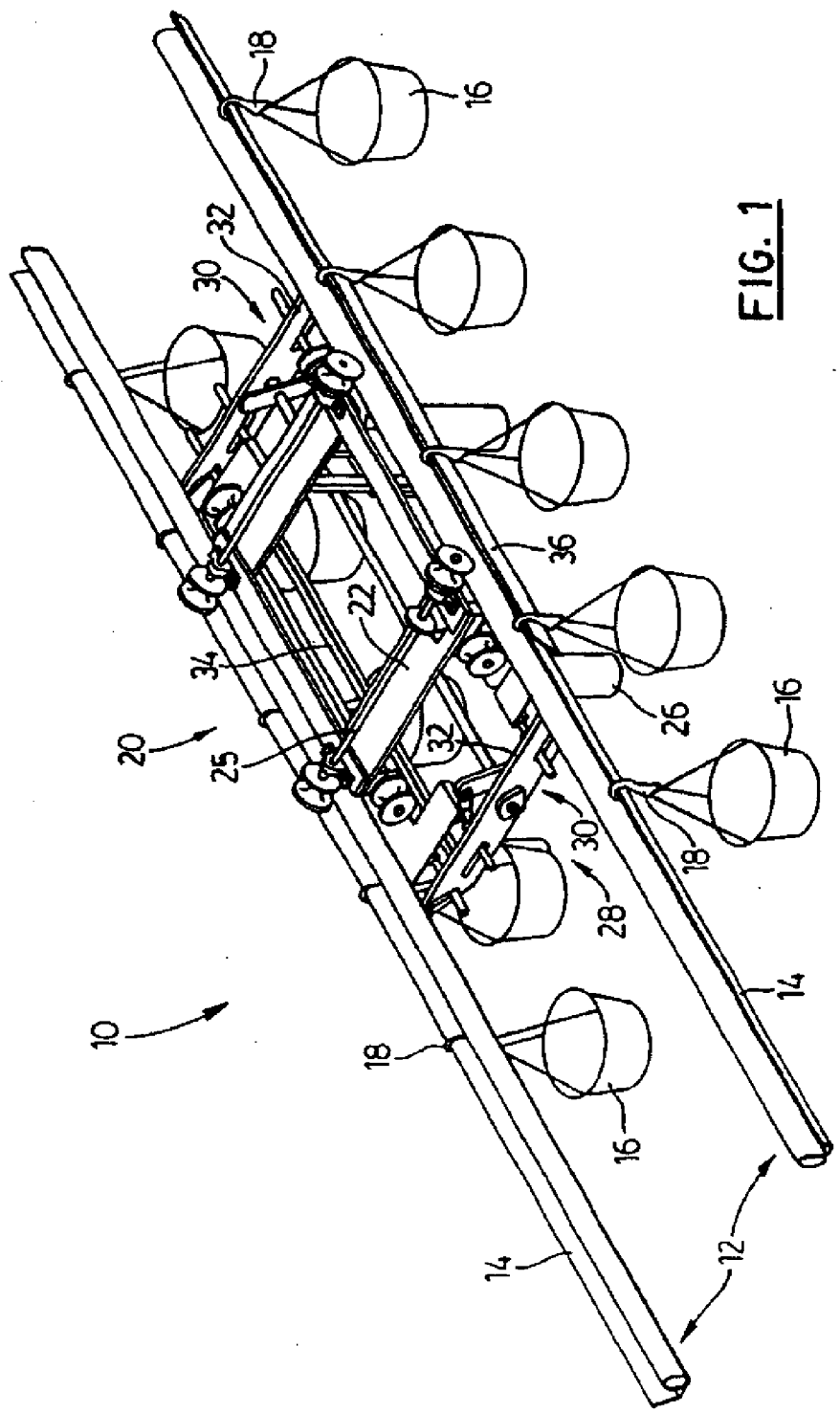
Figure 2:
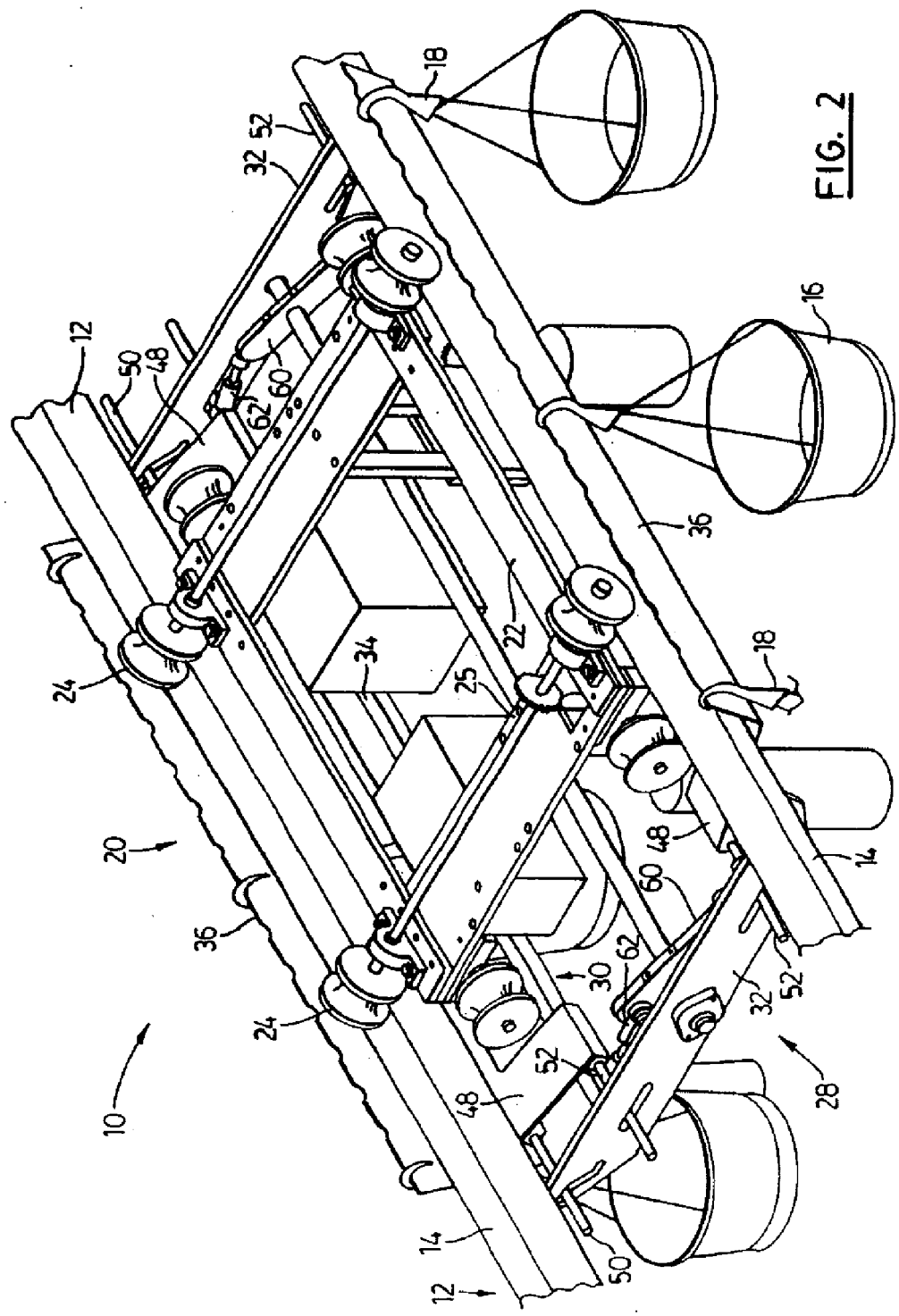
Figure 3:
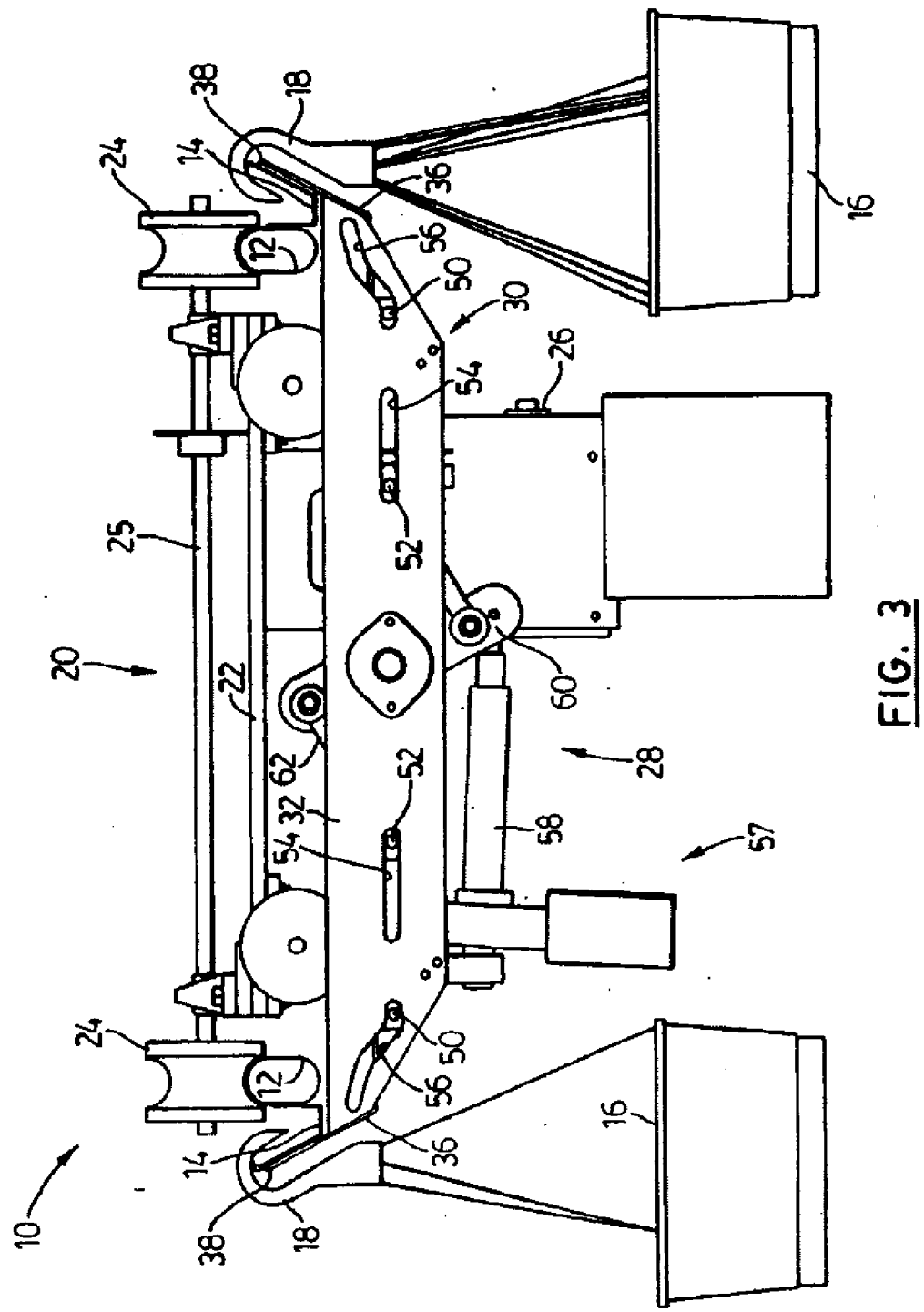
Figure 4:
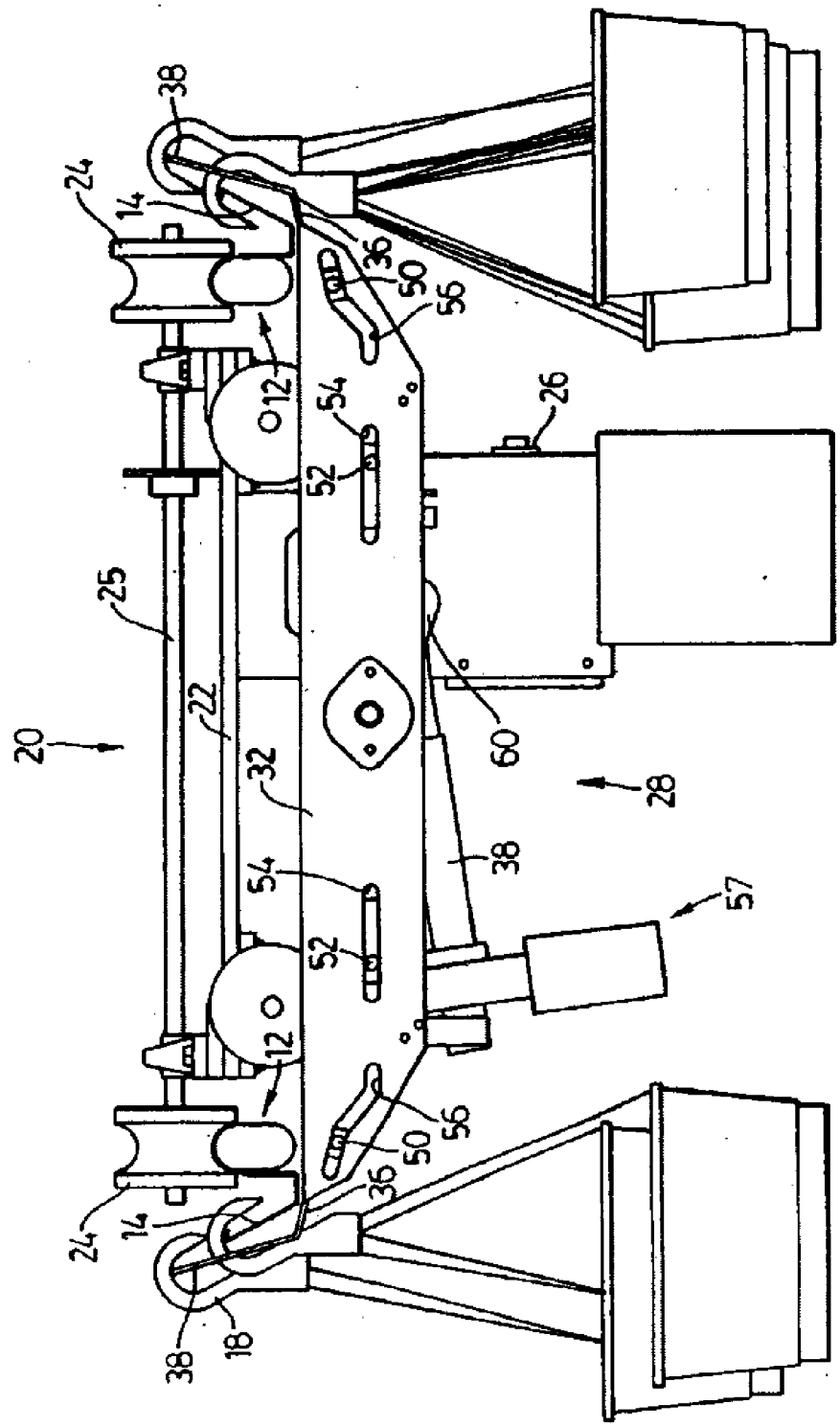
Figure 5:
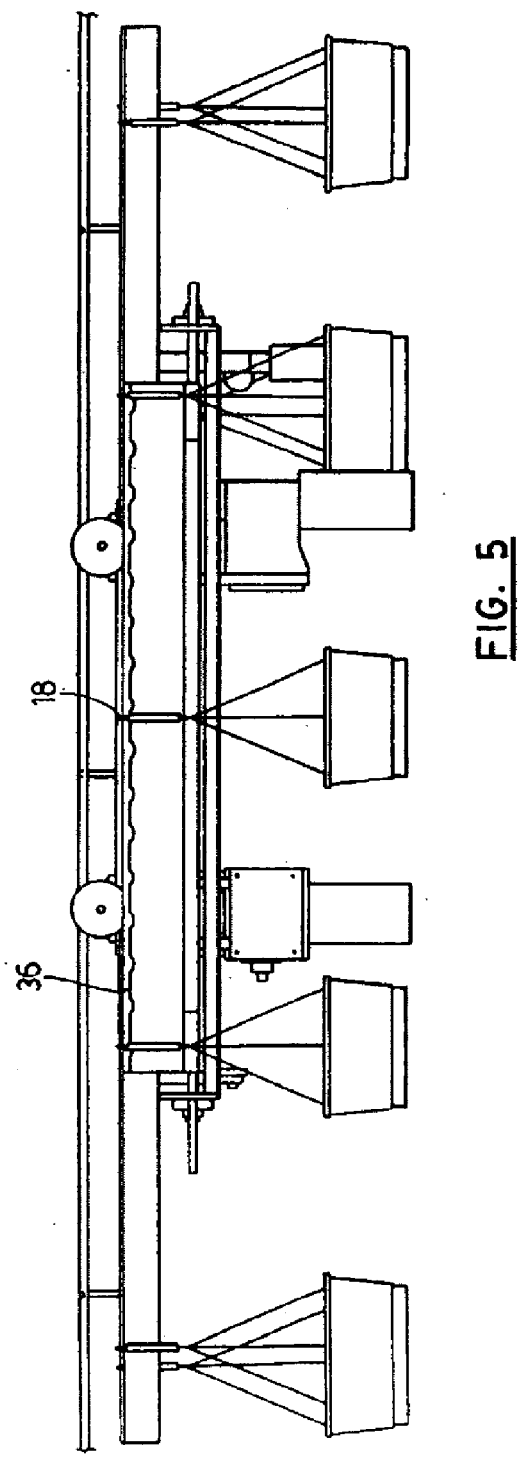
Figure 6:
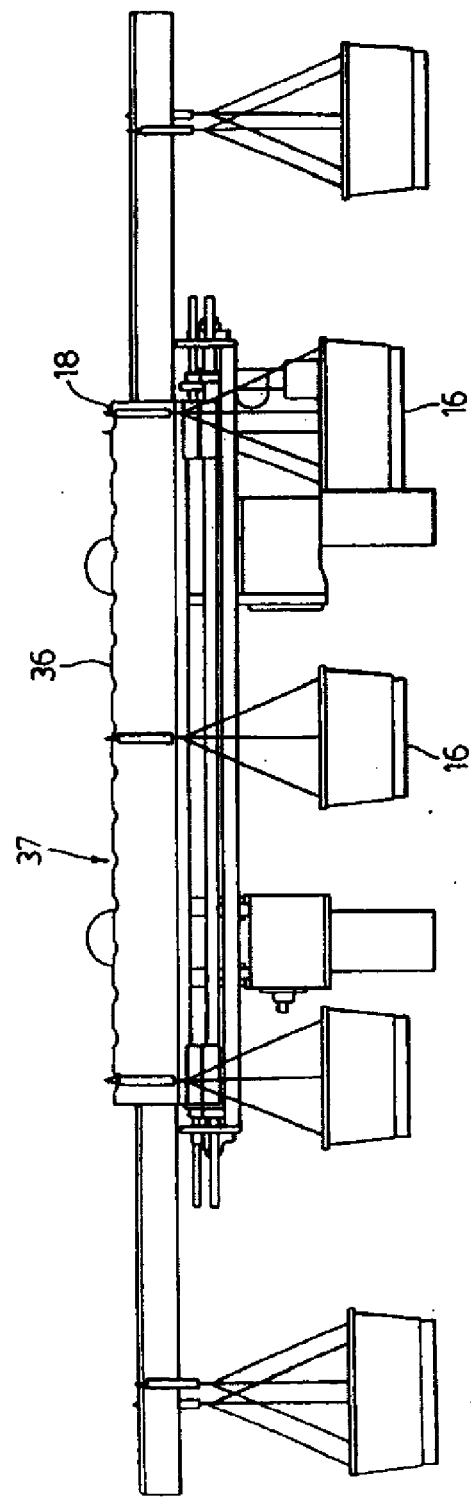
Figure 7:
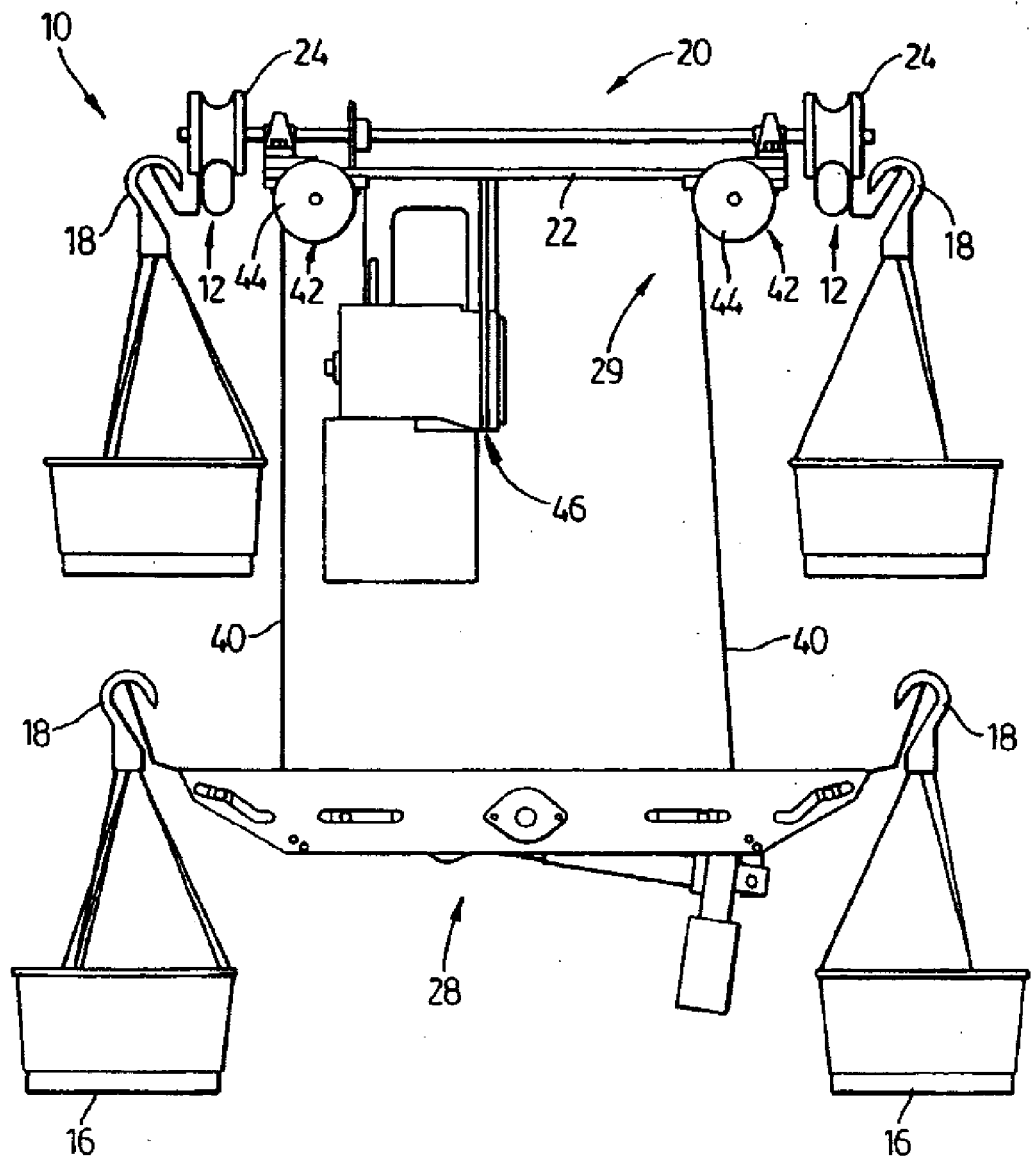
Figure 8:
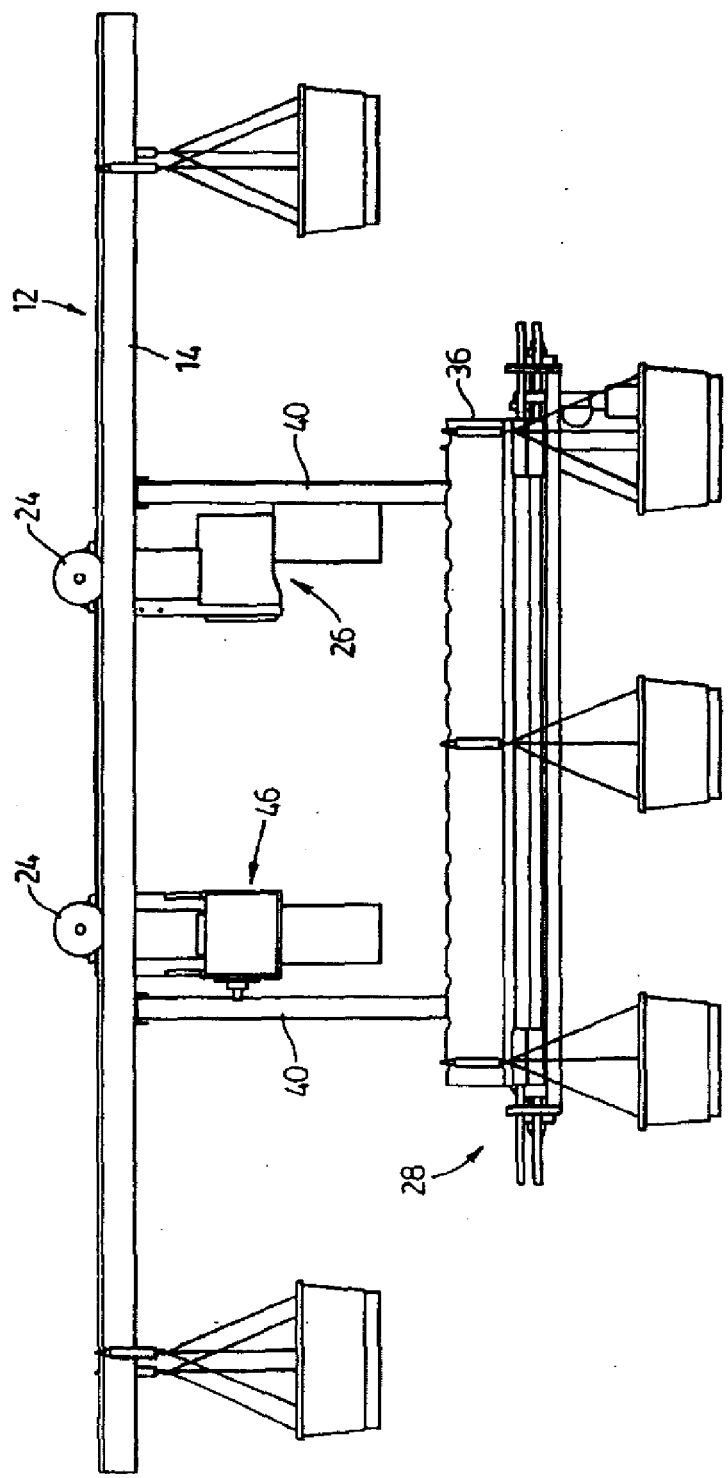
Figure 9:
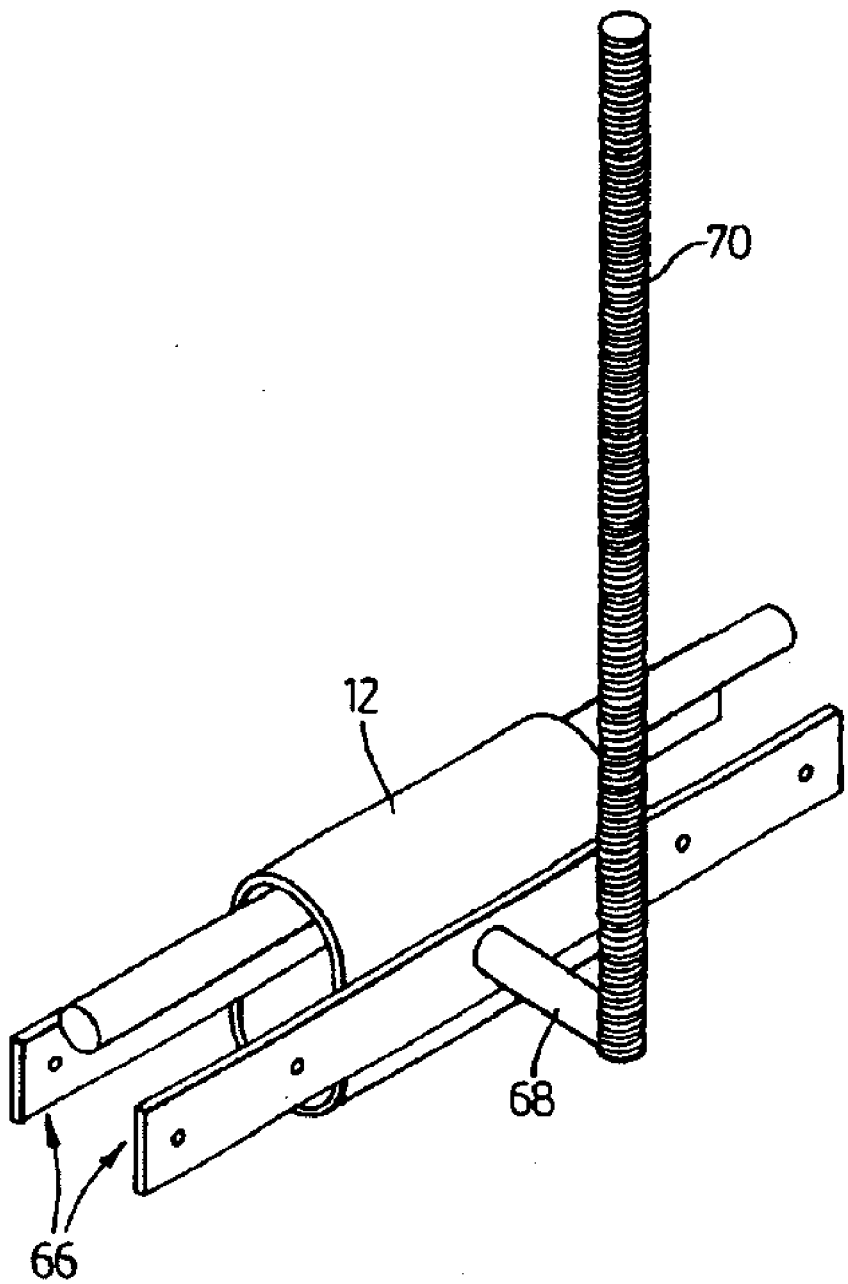

FIG. 9 shows an embodiment of a support 64 for use in securing the rails 12 to an existing structure. The support 64 includes inner and outer mounting plates 66 which are screwed or otherwise secured to the rail 12. An outwardly extending member 68 projects from the outer mounting plate 66. An elongate vertical member 70 extends upwards substantially perpendicular to the rails 12. The outwardly extending member 68 and the elongate vertical member 70 may be formed of a unitary piece of material bent in an L-shape. The elongate vertical member 70, or the upper end of the member 70, may be threaded and attached to the existing structure with a nut. Other means for attaching the support 64 to an existing structure may be provided, as will be understood by those skilled in the art.

The rails 12 of the system 10 may be employed for uses in addition to providing a track for the cart 20. For example, the rails 12 may carry an irrigation system either within the tubular rails 12 or attached externally. In one embodiment, the rails 12 themselves could feature a plurality of small apertures upon their underside so that they may serve as a conduit for a drip irrigation system. In another embodiment, the rails 12 may serve as conduits for hot water to serve thereby providing a radiant heating system. The rails 12 may alternatively or additionally carry electrical wiring for lighting systems, communications systems or any other systems. Further and other uses for the rails 12 will be understood by those skilled in the art.

The cart 20 according to the present invention may be employed for uses in addition to moving and hanging baskets. For example, the cart 20 may be used to transport other items, such as trays of plants, equipment, or personnel. Further and other uses for the cart 20 will be understood by those skilled in the art.

Furthermore, the cart 20 can be used with multiple sets of rails 12. This feature provides the economic advantage that a single cart 20 may be employed in an environment having more than one set of rails 12 for example a greenhouse with 3 sets of rails 12 running in parallel the length of the greenhouse. The system 10 may further include a cradle, crane or other mechanism for moving the cart 20 between sets of rails 12.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

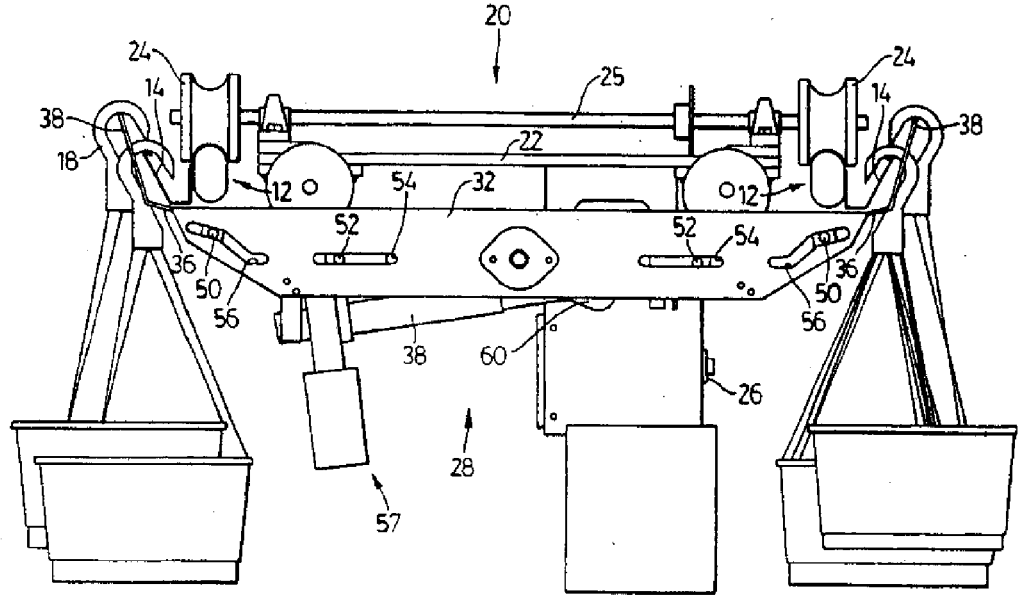

What is claimed is:

1. A system for moving articles, each article having a hook for hanging, the system comprising:
   a pair of laterally spaced parallel rails, each rail having an outer side distant from the other rail and having a lip protruding from said outer side for engaging the hooks to hang the articles, the lips on the rails being separated by a predetermined distance;
   a cart supported upon the rails, the cart including a cart frame, wheels rotatably attached to said cart frame and adapted to support said cart frame and roll upon the rails, and a lifting mechanism attached to said cart frame,
   said lifting mechanism having a frame and a pair of spaced apart wings, said wings being moveable between a retracted position and an extended position, in the retracted position said wings being disposed below the lips of said rails, and in the extended position said wings being disposed above the lips of said rails,
   said wings engaging the hooks of one or more of the articles hanging on the lips when said wings are moved into the extended position, allowing the articles to be repositioned along the rails using the cart.

2. The system as claimed in claim 1, wherein each of said wings includes an outer edge, and in said extended position, the outer edges of said wings being spaced apart a first distance greater than the predetermined distance, and in said retracted position, the outer edges of said wings being spaced apart a second distance and said second distance being less than said first distance.

3. The system as claimed in claim 2, wherein said lifting mechanism includes an actuator coupled to said wings, and said actuator being operable to move said wings between the retracted position and the extended position.

4. The system as claimed in claim 3, wherein the frame for said lifting mechanism includes a plurality of slots, and said wings including a plurality of pins for engaging the slots, and said slots and said pins coupling said wings to said frame and guiding the movement of said wings between the retracted position and the extended position.

5. The system as claimed in claim 4, wherein said actuator comprises a linear actuator coupled to a pivot member, said pivot member being pivotally coupled to the frame for said lifting mechanism and having each of its ends pivotally coupled to a respective one of said wings, such that the linear actuator pivots the pivot member, which moves said wings between the retracted position and the extended position.

6. The system as claimed in claim 2, wherein said lifting mechanism includes a motor operatively coupled to said wings to move the wings between the retracted position and the extended position.

7. The system as claimed in claim 2, wherein said lifting mechanism is coupled to the cart frame through a hoisting mechanism, said hoisting mechanism being operable for lifting and lowering said lifting mechanism relative to the cart frame.

8. The system as claimed in claim 7, wherein said hoisting mechanism includes a hoisting system selected from the group comprising a cable and pulley system, a cable and belt system, a chain and socket system, a bolt and screw system, and a rack and pinion system.

9. The system as claimed in claim 8, wherein said hoisting mechanism includes a motor coupled to said hoisting system.

10. The system as claimed in claim 1, wherein said cart includes a motor mounted to the cart frame, said motor being operatively coupled to at least one of the wheels to provide a driving rotational force to move the cart along the rails.

11. The system as claimed in claim 1, wherein the articles comprise baskets for holding plants in a greenhouse.

12. The system as claimed in claim 1, wherein the articles comprise lights.

13. The system as claimed in claim 1, wherein said rails comprise elongate tubular members having a plurality of apertures therethrough to permit fluid within the tubular members to drip exit therefrom, thereby providing an irrigation system for the hanging articles.

14. The system as claimed in claim 1, wherein each of said rails includes a tubular body.

15. The system as claimed in claim 14, wherein said body and said lip are integrally formed.

16. The system as claimed in claim 1, wherein said lip comprises an elongated sheet bent to form a trough having an outer wall for engaging the hooks and an inner wall secured to the outer side of said rail.

17. A system for moving articles, each article having a hook for hanging, said system comprising:
 a pair of laterally spaced parallel rails, each rail having an outer side distant from said other rail and having a lip protruding from said outer side for engaging the hooks to hang the articles, the lips on said rails being separated by a predetermined distance;
 a cart supported upon said rails, said cart including, a frame and wheels rotatably attached to said frame and adapted to support said frame and roll upon said rails, and lifting means attached to said frame for lifting and supporting one or more of the articles hanging on said lips so that one or more of the articles are movable to another position along said rails,
 said lifting means including means for engaging the hooks, said engaging means being moveable between a retracted position and an extended position, and in said extended position said engaging means engaging the hooks of one or more articles above said lips, and in said retracted position said engaging means being disposed below said lips.

18. The system as claimed in claim 17, wherein in said extended position, said engaging means span a first distance, said first distance being greater than said predetermined distance, and in said retracted position, said engaging means spanning a second distance, and said second distance being less than said first distance.

19. The system as claimed in claim 18, wherein said lifting means includes an actuator coupled to said engaging means for moving said engaging means between said retracted position and said extended position.

20. The system as claimed in claim 18, wherein said lifting means comprises a motor operatively coupled to said engaging means for driving said engaging means between said retracted position and said extended position.

21. The system as claimed in claim 18, wherein said lifting means is coupled to the frame for said cart through a hoisting means for lifting and lowering said lifting means relative to said frame.

22. The system as claimed in claim 21, wherein said hoisting means includes a hoisting system selected from the group comprising a cable a pulley system, a cable and belt system, a chain and socket system, a bolt and screw system, an a rack and pinion system.

23. The system as claimed in claim 22, wherein said hoisting means includes a motor coupled to said hoisting system.

24. The system as claimed in claim 17, wherein said cart includes a motor mounted to said frame, said motor being operatively coupled to at least one of said wheels and providing a driving rotational force to move said cart along said rails.

25. The system as claimed in claim 17, wherein the articles include baskets for holding plants in a greenhouse.

26. The system as claimed in claim 17, wherein the articles comprise lights.

27. The system as claimed in claim 17, wherein said rails comprise tubular members providing for flow of a fluid and having a plurality of apertures to release said fluid along the length of said tubular members, thereby providing an irrigation system for the articles hanging on said rails.

28. A cart for moving articles hung on a pair of late rally spaced rails, each of the rails having an outer side distant from the other rail and having lip protruding from outer side for engaging hooks to hang the articles, the lips on the rails being separated by a predetermined distance, said cart comprising:
 a cart frame;
 wheels rotatably attached to said cart frame and said wheels being adapted to support said cart frame and roll upon the rails; and
 a lifting mechanism attached to said cart frame,
 said lifting mechanism including a frame and a pair of spaced apart wings displaceably coupled to said frame, and said wings being moveable between a retracted position and an extended position, and in said retracted position said wings being disposed below the lips, and in said extended position said wings being disposed above the lips,
 said wings engaging the hooks of one or more of the articles hanging on the lips when said wings are moved into said extended position, allowing the articles to be repositioned along the rails using the cart.

29. The cart as claimed in claim 28, wherein in said extended position, said wings are spaced apart a first distance, said first distance being greater than the predetermined distance, and wherein in said retracted position, said wings being spaced apart a second distance, said second distance being less than said first distance.

30. The cart as claimed in claim 29, wherein said lifting mechanism includes an actuator coupled to said wings for moving said wings between said retracted position and said extended position.

31. The cart as claimed in claim 30, wherein the frame for said lifting mechanism includes a plurality of slots and the said wings include a plurality of pins for engaging said slots, said slots and said pins coupling said wings to the frame of said lifting mechanism and guiding the movement of said wings between said retracted position and said extended position.

32. The cart as claimed in claim 31, wherein said a actuator comprises a linear actuator coupled to a pivot member, said pivot member being pivotally coupled to the frame of said lifting mechanism and having each of its ends pivotally coupled to a respective one of said wings, so that said linear actuator pivots said pivot member to move said wings between said retracted position and said extended position.

33. The cart as claimed in claim 29, wherein said lifting mechanism includes a motor operatively coupled to said wings to move said wings a between said retracted position and said extended position.

34. The cart as claimed in claim 29, said lifting mechanism being coupled to the cart frame through a hoisting mechanism for lifting and lowering said lifting mechanism relative to said cart frame.

35. The cart as claimed in claim 34, wherein said hoisting mechanism includes a hoisting system selected from the group comprising a cable and pulley system, a cable and belt system, a chain and socket system, a bolt and screw system, and a rack and pinion system.

36. The cart as claimed in claim 35, wherein said hoisting mechanism includes a motor couple to said hoisting system.

37. The cart as claimed in claim 28, wherein said cart includes a motor mounted to the cart frame, said motor being operatively coupled to at least one of said wheels to provide a driving rotational force to move the cart along the rails.

* * * * *

UNITED STATES PATENT AND TRADEMARK OFFICE
CERTIFICATE OF CORRECTION

PATENT NO. : 6,848,877 B2
DATED : February 1, 2005
INVENTOR(S) : Hendriks et al.

It is certified that error appears in the above-identified patent and that said Letters Patent is hereby corrected as shown below:

Drawing sheets, consisting of Fig. 1-9, should be deleted and replaced with the drawing sheets, consisting of Fig. 1-9, as shown on the attached pages.

Signed and Sealed this

Third Day of May, 2005

JON W. DUDAS
*Director of the United States Patent and Trademark Office*

(12) United States Patent
Hendriks et al.

(10) Patent No.: US 6,848,877 B2
(45) Date of Patent: Feb. 1, 2005

(54) SYSTEM FOR MOVING AND HANGING ARTICLES

(76) Inventors: Rob Hendriks, 3666 Claus Road, Vineland Station (CA), L0R 2S0; Ken Giesbrecht, 4380 Jordan Road, Jordan Station (CA), L0R 1S0

(*) Notice: Subject to any disclaimer, the term of this patent is extended or adjusted under 35 U.S.C. 154(b) by 189 days.

(21) Appl. No.: 10/162,364

(22) Filed: Jun. 3, 2002

(65) Prior Publication Data
US 2003/0223850 A1 Dec. 4, 2003

(51) Int. Cl.[7] ................................................ B65G 1/16
(52) U.S. Cl. ........................ 414/281; 414/266; 414/279
(58) Field of Search ............................ 414/266, 279, 414/281

(56) References Cited
U.S. PATENT DOCUMENTS

| | | | |
|---|---|---|---|
| 2,682,345 A | * | 6/1954 | Neaverson .................. 414/266 |
| 2,816,643 A | * | 12/1957 | Klamp ..................... 198/465.4 |
| 3,051,096 A | * | 8/1962 | Walsh et al. ............... 198/687.1 |
| 3,180,279 A | * | 4/1965 | Thibault ..................... 104/89 |
| 4,717,305 A | * | 1/1988 | Edwards ..................... 414/349 |
| 5,509,572 A | * | 4/1996 | Curtis ........................ 221/76 |
| 5,573,101 A | * | 11/1996 | Ouwejan ................... 198/349 |
| 5,899,255 A | * | 5/1999 | Petracini et al. ............. 160/343 |
| 6,152,288 A | * | 11/2000 | Woltjer et al. .............. 198/465.4 |

* cited by examiner

*Primary Examiner*—Thomas J. Brahan
(74) *Attorney, Agent, or Firm*—Townsend and Townsend and Crew LLP

(57) ABSTRACT

A system for maneuvering and hanging articles on rails. The system is operable to select one or more hanging articles, disengage their hooks from the rails, reposition them, and re-hang them in a new position on the rails. The system includes a cart for lateral movement upon a set of rails, the cart having wings for lifting hanging articles off the rails and setting hanging articles onto the rails. The cart has a lifting mechanism, which can be lowered so as to drop hanging articles down to a work area or to raise the hanging articles for placement upon the rails. The system may be employed in a greenhouse for moving hanging baskets of plants.

37 Claims, 9 Drawing Sheets